US008056932B2

(12) United States Patent
Wents

(10) Patent No.: US 8,056,932 B2
(45) Date of Patent: Nov. 15, 2011

(54) DUCT CORNER ACCESSORY WITH PIVOTING FLAPS

(75) Inventor: Thierry Wents, Longue Vue (FR)

(73) Assignee: Legrand France, Limoges (FR)

( * ) Notice: Subject to any disclaimer, the term of this patent is extended or adjusted under 35 U.S.C. 154(b) by 392 days.

(21) Appl. No.: 12/327,016

(22) Filed: Dec. 3, 2008

(65) Prior Publication Data

US 2009/0148227 A1 Jun. 11, 2009

(30) Foreign Application Priority Data

Dec. 6, 2007 (FR) ...................................... 07 08522

(51) Int. Cl.
*F16L 27/00* (2006.01)
(52) U.S. Cl. .......... 285/183; 285/184; 403/84; 403/101; 403/205
(58) Field of Classification Search ............ 403/84, 403/91, 100, 101, 119, 150, 157, 205, 403, 403/13, 14, 152, 154, 155, 162; 285/179, 285/179.1, 179.2, 183, 184, 185, 424; 248/300; 16/254, 257, 270, 386
See application file for complete search history.

(56) References Cited

U.S. PATENT DOCUMENTS

| | | | |
|---|---|---|---|
| 3,000,049 A * | 9/1961 | Terry, Jr .......................... | 16/386 |
| 3,823,522 A * | 7/1974 | Jureit et al. ...................... | 52/641 |
| 6,478,499 B1 * | 11/2002 | Fugman et al. .................. | 403/82 |
| 7,055,688 B2 * | 6/2006 | Watson et al. ............. | 206/308.1 |
| 7,594,575 B2 * | 9/2009 | Choi et al. ....................... | 16/257 |
| 2005/0111909 A1 | 5/2005 | Mathieu et al. | |

FOREIGN PATENT DOCUMENTS

| | | |
|---|---|---|
| DE | 20 2005 012 520 | 11/2005 |
| EP | 1 530 273 | 5/2005 |
| EP | 1 750 339 | * 7/2011 |

OTHER PUBLICATIONS

French Search Report dated Jun. 18, 2008, from corresponding French application.

* cited by examiner

*Primary Examiner* — Michael P Ferguson
(74) *Attorney, Agent, or Firm* — Young & Thompson

(57) ABSTRACT

The invention relates to a corner accessory for placing at the junction between at least two ducts that extend in different directions, the accessory comprising two distinct flaps, one of which includes a projecting element and the other of which includes a circular opening receiving said projecting element to allow said flaps to pivot about a pivot axis, the circular edge of said opening opening out locally to a straight slot that extends radially relative to the circular edge of said opening and that opens out into a free edge of said flap. According to the invention, said projecting element is a cylindrical wall presenting firstly an outside diameter equal, ignoring clearance, to the inside diameter of said circular opening so that during pivoting of one flap relative to the other, the outside face of said cylindrical wall slides over the edge face of the circular edge of said opening, and presenting secondly a height that varies around its circumference.

10 Claims, 2 Drawing Sheets

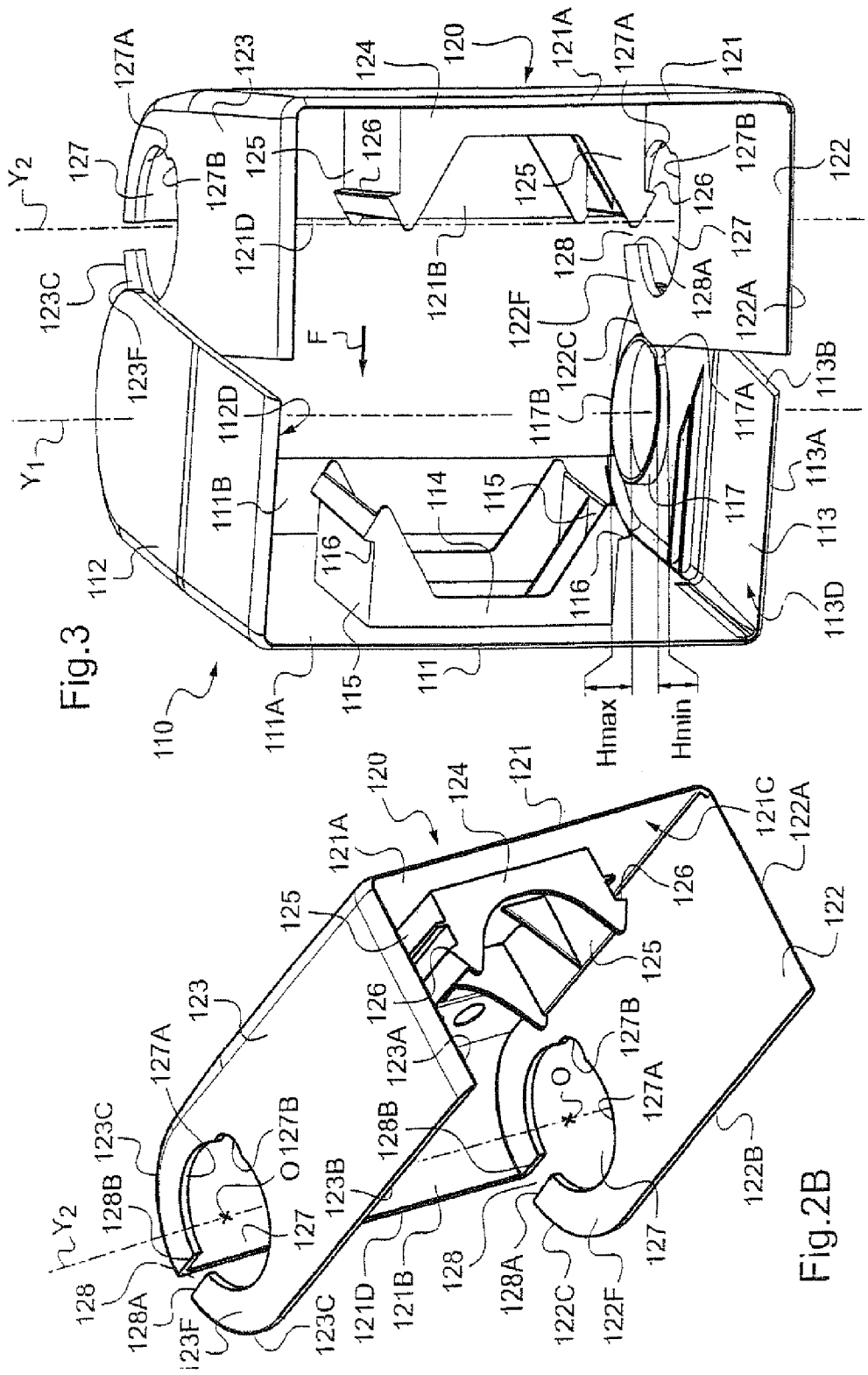

DUCT CORNER ACCESSORY WITH PIVOTING FLAPS

BACKGROUND OF THE INVENTION

1. Field of the Invention

The present invention relates in general to ducts of the type used, for example, to support, house, and protect various pieces of equipment, such as pieces of electrical equipment, and also to support, house, and protect cables, conductors, pipes, or other pieces of equipment needed for serving said pieces of equipment.

The invention relates more particularly to a corner accessory for placing at the junction between at least two ducts that extend in different directions, the accessory comprising two distinct flaps, one of which includes a projecting element and the other of which includes a circular opening receiving said projecting element to allow said flaps to pivot about a pivot axis, the circular edge of said opening opening out locally to a straight slot that extends radially relative to the circular edge of said opening and that opens out into a free edge of said flap.

A particularly advantageous application of the invention lies in making an inside or an outside corner accessory for ducts.

2. Description of Related Art

Document IT 01281834 discloses a corner accessory having a web that includes facing lugs at one end of its flanges, which lugs carry studs for insertion into circular openings provided in the flanges of the other web.

The webs are assembled together by squeezing together a little the flanges of the web including said openings so as to deform said flanges elastically and engage said studs in said openings.

Thus, said webs can take up different relative angular positions between a first extreme position in which the web carrying the studs uncovers a maximum amount of the other web so as to form an angle less than equal to 90°, and a second extreme position in which said web carrying the studs completely overlies the other web so as to form an angle greater than 90°.

In addition, according to that document, each of said lugs carrying the studs of the corresponding web presents a circular edge provided with a chamfer such that when said web is in the second extreme position completely overlying the other web, the edge co-operates with a recessed corner in the vicinity of the opening on the outer surface of the rim of the corresponding web. That co-operation of chamfers with corners ensures that when in said second extreme position, an impact on said webs will not cause the studs to escape from said openings and thus said webs to be disassembled.

Such an accessory presents several drawbacks.

Firstly, it is difficult to assemble the two flaps of the accessory together since that requires said flaps to be deformed and requires the studs to be brought into alignment with the respective openings while they are unseen.

Furthermore, in order to limit the amount of deformation that is necessary for the flap including said openings, and thus make it easier to assemble the flaps together, the studs provided on the other flap are of small height. Thus, when an impact occurs against said flaps, it can easily cause the studs to escape from said openings and thus cause the flaps to be disassembled. Apart from the arrangement of chamfers and corners, the accessory does not include any means for ensuring, that in the relative angular positions of said webs other than said above-mentioned extreme positions, an impact against said webs does not cause the stud to escape from said openings, i.e. does not cause said webs to be disassembled.

Finally, document DE 20 2005 012 520 U describes an outside or inside corner accessory having two distinct identical flaps that are hinged to each other via a peg provided on one of the flaps with the shank thereof engaging via a slot in an opening provided in the other flap. Each flap comprises a web between two facing flanges on two opposite sides, the flanges extending substantially at right angles to the web, the peg being provided on the inside face of a portion of the flange that covers a portion of the flange provided with said opening in the other flap.

BRIEF SUMMARY OF THE INVENTION

Compared with the above-mentioned state of the art, the present invention proposes a corner accessory in which the flaps are arranged in such a manner as to make them easier to assemble together, while ensuring that an impact against said flaps does not cause them to be disassembled, regardless of their relative position in use.

More particularly, the present invention provides an accessory as defined in the introduction, wherein said projecting element is a cylindrical wall presenting firstly an outside diameter equal, ignoring clearance, to the inside diameter of said circular opening so that during pivoting of one flap relative to the other, the outside face of said cylindrical wall slides over the edge face of the circular edge of said opening, and presenting secondly a height that varies around its circumference.

Other characteristics of the corner accessory of the invention that are non-limiting and advantageous are as follows:

- said cylindrical wall includes a bulge projecting outwards and the circular edge of said opening includes a corresponding setback in its edge face;
- said circular opening presents an inside diameter lying in the range 2 centimeters (cm) to 4 cm, and preferably equal to about 3 cm;
- each flap comprises a web lying between two facing flanges extending substantially at right angles to said web from to opposite sides thereof, said projecting element being provided on the inside face of a flange of the flap that partially covers the flange provided with said circular opening of the other flap;
- on the facing inside faces of its flanges, one of said flaps carries two facing elements, and correspondingly, in its flanges, the other of said flaps includes said circular openings that open out via said slots to free edges of the flap that are covered by the flanges of the first flap;
- the web of each flap comprises a straight portion and a rounded portion, and each of the two flanges of each flap includes a straight free edge that extends longitudinally and runs into a rounded free edge at the side connecting to a free edge of said rounded portion of said web, each of the projecting elements and each of the circular openings of each flap being placed respectively in the proximity of said rounded free edge at the side of the corresponding flange of the flap;
- each slot opens out into said rounded free edge at the side of the corresponding flange of each flap at the junction with the free edge of said rounded portion of the corresponding web of the flap;
- in each flange of the corresponding flap, a resilient assembly tab is defined by one edge of the slot forming the free edge at the end of said assembly tab, by a portion of the circular edge of said circular opening provided in said flange, and by a portion of the free edge of said flange into which said slot opens out, said portions of said circular edge and of said free edge forming the parallel longitudinal edges of said assembly tab; and each cylindrical wall forming a projecting element on the inside face of a web of the corresponding flap presents a maximum height beside the inside face of said web, said height decreasing progressively from a maximum to reach a minimum height beside the free edge of said flange of the flap.

BRIEF DESCRIPTION OF THE DRAWINGS

The following description with reference to the accompanying drawings, given by way of non-limiting example, shows clearly what the invention consists in and how it can be reduced to practice.

In the accompanying drawings:

FIG. 2B is a diagrammatic perspective view from the inside of the other flap of the FIG. 1 corner accessory; and FIG. 3 is a diagrammatic view seen from the inside showing how the two flaps of FIGS. 2A and 2B are assembled together.

BRIEF DESCRIPTION OF THE INVENTION

Figure 1:
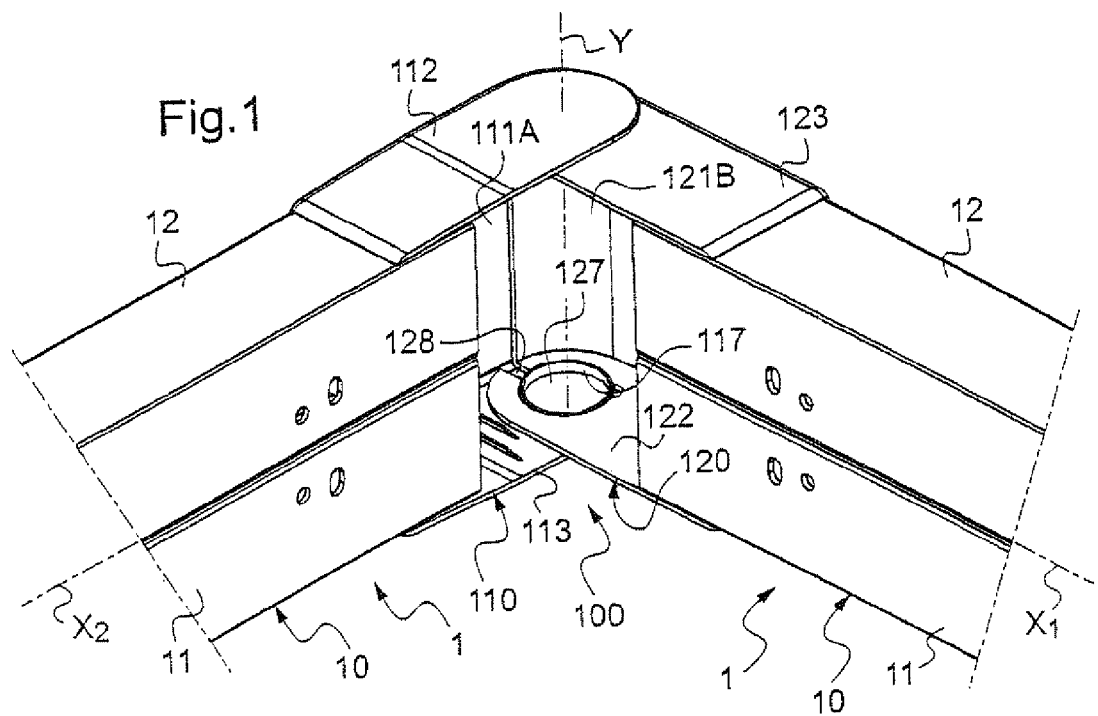
FIG. 1 is a diagrammatic view of the inside of the corner accessory of the invention placed at the junction between two ducts that extend in different directions.

FIG. 1 shows a corner accessory 100 located at the junction between two ducts 1 extending in different directions X1 and X2.

The corner accessory 100 shown is an outside corner accessory that is particularly adapted to joining together two ducts 1 that in practice are at a relative angle lying in the range 60 to 95°, and that is preferably equal to 90°.

With consideration to two walls (not shown) forming a projecting dihedral, the bases 10 of two ducts 1 are each placed flat against respective ones of the two walls, e.g. running along the base of the walls to constitute respective baseboards.

The bases 10 of the ducts 1 are cut and positioned so as to meet edge to edge in practically touching manner via their back faces so as to form substantially the same projecting angle as is formed between the support walls.

As can be seen more particularly in FIG. 1, the bases 10 of the ducts 1 are substantially of channel section with respective webs 11 and pairs of parallel flanges 12 extending perpendicularly from the webs 11, on either side thereof.

Between the two flanges 12 of each base 10 there is defined a longitudinal opening together with a space for receiving various cables and pieces of electrical equipment.

The longitudinal opening of each base 10 is closed by cover segments (not visible in FIG. 1) having snap-fastener tabs for engaging arrangements made on the inside of the base 10.

For this purpose, it is possible to provide for the two flanges 12 of each base 10 to carry at their ends rims (not visible in FIG. 1) that extend towards each other substantially parallel to said web 11 and in the same plane as the cover segments.

In addition, the longitudinal opening of each base 10 of each duct 1 may lie between two reentrant longitudinal walls (not visible in FIG. 1) that are mutually parallel and also parallel to the two flanges 12 of the base 10. Each reentrant wall is connected to the free edge of a rim and extends perpendicularly therefrom. The longitudinal opening is provided with two clip-fastener strips (not visible in FIG. 1) suitable for enabling the cover segment to be mounted.

In particular, each clip-fastener strip may comprise a longitudinally-extending margin (not visible in FIG. 1) attached by a spacer (not visible in FIG. 1) to the free inside edge of the corresponding reentrant wall. The spacer co-operates with said longitudinal margin and the reentrant wall to define a longitudinal groove that is open towards the front of the base 10 of the duct 1.

Each cover segment (not visible in FIG. 1) carries perpendicularly on its rear face, in parallel and along each of its two longitudinal edges, firstly a row of engagement tabs for engaging in the corresponding longitudinal groove of the base 10, and secondly a row of snap-fastener tabs for catching under said longitudinal groove.

The corner accessory 100 is a cover that locally takes the place of the cover segment of each duct 1, covering the cut ends of the flanges 12 of said bases 10 and the corresponding rims. It preferably also covers the cut ends of said cover segments.

As shown more particularly in FIGS. 1 and 3, the corner accessory 100 comprises two distinct flaps 110, 120 that are assembled together so as to allow one flap to pivot relative to the other about a pivot axis Y.

Each flap 110; 120 is advantageously made as a one-piece molding of plastics material.

Figure 2A:
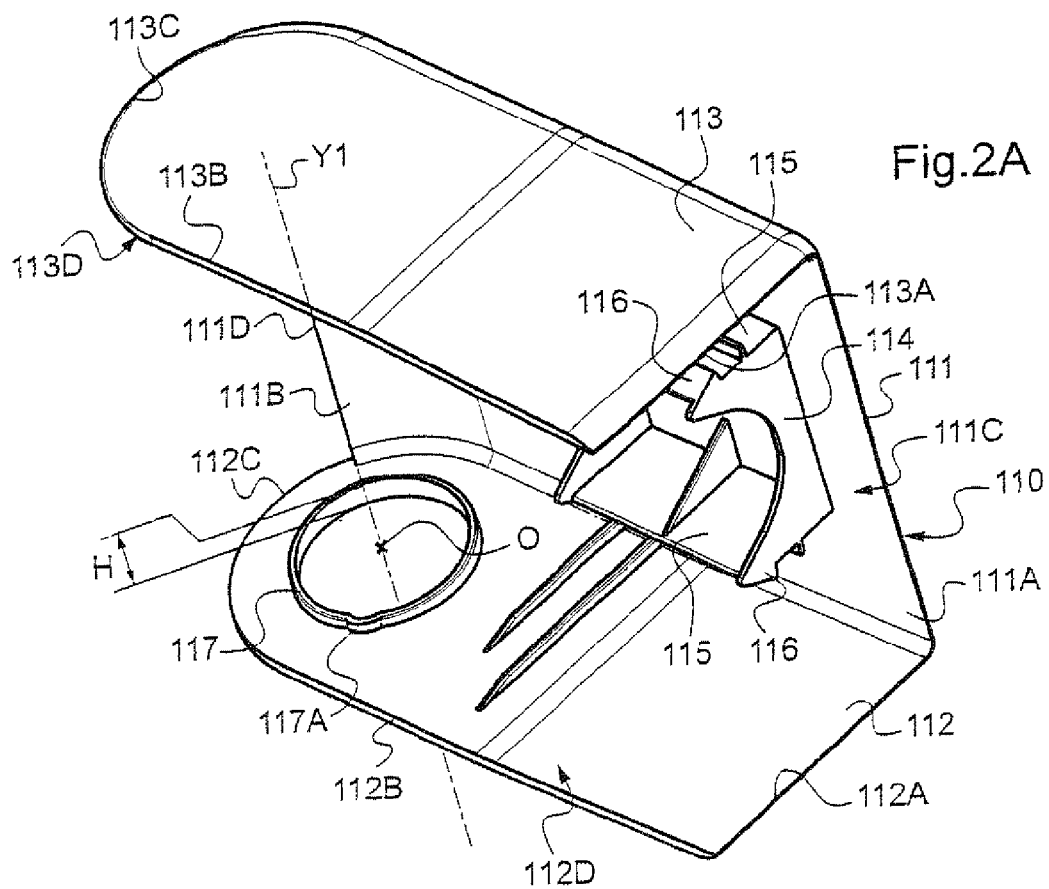
FIG. 2A is a diagrammatic perspective view from the inside of one of the flaps of the FIG. 1 corner accessory.

Each flap is of channel section with a web 111; 121 lying between two facing flanges 112 & 113; 122 & 123 on two opposite sides extending substantially at right angles to the corresponding web 111; 112 (see FIGS. 2A, 2B).

The web 111; 121 of each flap 110; 120 comprises a straight portion 111A, 121A for covering the cut end of a cover segment of one of the ducts 1, and a rounded portion 111B; 121B. The rounded portion 111B; 121B is a cylindrical wall portion that becomes superposed at least in part with the rounded portion of the other flap so as to close the corner formed between said ducts 1 (see FIG. 1), thereby providing continuity for the covers between the cover segments of said ducts 1.

The facing flanges 112 & 113; 122 & 123 of each flap 110; 120 are generally rectangular in shape, each having three free edges 112A, 112B & 112C; 113A, 113B & 113C; 122A, 122B &, 122C; 123A, 123B & 123C, and one side connected to the corresponding side of said web 111; 121 (see FIGS. 2A and 2B).

More particularly, each of the two flanges 112 & 113; 122 & 123 of each flap 110; 120 has a straight free edge 112A, 113A; 122A, 123A on one side extending perpendicularly to the edge of the straight portion 111A; 121A of said web 111; 121, and a straight free edge 112B, 113B; 122B, 123B extending longitudinally and running into a rounded free edge 112C, 113C; 122C, 123C on one side joining a free edge 111D; 121D of said rounded portion 111B; 121B of said web 111; 121 (see FIGS. 2A and 2B).

The facing flanges 112 & 113; 122 & 123 of each flap 110; 120 are designed to overlap in part the flanges 12 of the bases 10 of the ducts 1 meeting at the corner. In addition, the flanges 112 & 113 of one flap 110 are superposed in part over the flanges 123 & 122 of the other flap 120 so as to act in the corner formed by said ducts 1 to provide continuity between the flanges of said ducts.

As shown in FIGS. 2A, 2B, and 3, the webs 111; 121 of said flaps 110; 120 include on their inside faces connection means that are suitable for holding the flaps relative to the ducts 1.

More particularly, the straight portion 111A; 121A of the web 111; 121 of each flap 110; 120 carries on its inside face 111C; 121C a respective channel-section member 114, 124 comprising two parallel branches 115; 125 that extend perpendicularly from the inside face 111C; 121C of said straight portion 111A; 121A. The two branches 115; 125 of each section member 114; 124 carry pairs of teeth 116; 126 on opposite faces for catching behind the spacers, under the longitudinal grooves of the base 10 of the corresponding duct 1.

One of the flaps 110 thus catches on the base 10 of one of the ducts 1, while the other flap 120 catches on the base 10 of the other duct 1.

According to a particularly advantageous characteristic of the corner accessory 100, one of the flaps 110 has a projecting element 117, and the other flap 120 has a circular opening 127 receiving said projecting element 17 so as to enable said flaps 110; 120 to pivot about the pivot axis Y.

More particularly, and as shown in FIGS. 2B and 3, the circular edge 127A of said opening 127 of the flap 120 is locally open via a slot 128 that opens out to a free edge 122C of said flap 120.

The projecting element 117 is provided on the inside face 113D of a flange 113 of the flap 110 that partially covers the flange 122 provided with said circular opening 127 in the other flap 120.

As shown in FIG. 3, on the facing inside faces 112D and 113D of its flanges 112 and 113, one of said flaps 110 carries two facing projecting elements 117, and correspondingly, in its two flanges 123 and 122, the other of said flaps 120 includes said circular openings 127 that open out via said slots 128 to the free edges 123C and 122C of the flap 120 covered by the flanges 112 and 113 of the first flap 110.

Each projecting element is a cylindrical wall 117 of outside diameter equal, ignoring clearance, to the inside diameter of each circular opening 127 so that during pivoting of one flap 110 relative to other flap 120, the outside face of each cylindrical wall 117 slides over the edge face of the circular edge 127A of the corresponding opening 127.

Each circular opening 127 presents an inside diameter lying in the range 2 cm to 4 cm, and preferably equal to about 3 cm.

Each cylindrical wall 117, forming a projecting element of the flap 110 is located close to the rounded free edge 112C, 113C at the side of the corresponding flange 112, 113 so that the two facing cylindrical walls 117 are centered on the axis Y1 of the cylindrical wall portion 111B of the web 111 of the flap 110 (see FIGS. 2A and 3).

Each circular opening 127 of the flap 120 is placed close to the rounded free edge 122C, 123C at the side of the corresponding flange 122, 123 so that the two facing circular openings 127 are centered on the axis Y2 of the cylindrical wall portion 121B of the web of the flap 120 (see FIGS. 2B and 3).

Advantageously, each cylindrical wall 117 forming the projecting element on the inside face 112D of a flange 112 of the flap 110 presents a height H that varies continuously around its circumference (see FIG. 2A).

More particularly, each cylindrical wall 117 forming a corresponding projecting element presents a maximum height Hmax beside the inside face 111C of said web 111, said height decreasing progressively from a maximum down to a minimum height Hmin beside the straight longitudinally-extending free edge 113B of said flange 113 of the flap 110 (see FIG. 3).

Thus, each cylindrical wall 117 presents a sloping edge 117B forming a ramp that rises going from the outside towards the inside of the flap 110.

In addition, each cylindrical wall 117 that forms a corresponding projecting element has an outwardly projecting bulge 117A, and the circular edge 127A of each circular opening 127 includes a corresponding setback 127B in its edge face (see FIGS. 2A, 2B, and 3).

In the example shown in the figures, each slot 128 is straight and extends radially relative to the circular edge 127A of the corresponding circular opening 127. Each slot 128 in this embodiment opens out into said rounded free edge 122C, 123C on the side of the corresponding flange 122, 123 of the flap 120 at the junction with the free edge 121D of said rounded portion 121 of the web 121 of the flap 120. Thus, one edge 128B of each slot 128 joins the free edge 121D of the rounded portion 121B of the web 121 of the flap 120 (see FIG. 2B).

Thus, advantageously, an elastic assembly tab 122F, 123F is defined in each flange 122, 123 of the corresponding flap 120 by an edge 128A of the slot 128 forming the end free edge of said assembly tab 122F, 123F, by a circular edge portion 127A of said circular opening 127 provided in said flange, and by a portion of the rounded free edge 122C, 123C at the side of said flange 122, 123 into which said slot 128 opens out, these portions of said circular edge 127A and of said rounded free edge 122C, 123C at the side forming parallel rounded longitudinal edges of said assembly tab 122F, 123F.

As shown more particularly in FIG. 3, the two flaps 110; 120 of the corner accessory 100 are assembled together simply by engaging the flanges 122, 123 of the flap 120 having said circular openings 127 sideways between the flanges 113, 112 of the flap 110 carrying said cylindrical walls 117 forming said projecting elements.

In this way, the outer face of each assembly tab 122F, 123F of each flange 122, 123 of the flap 120 lies on the sloping edge 117B of the cylindrical wall 117 forming the projecting element of the flap 110. The rising ramp formed by the sloping edge 117B of each cylindrical wall 117 causes each assembly tab 122F, 123F to bend elastically a little until it has gone past each cylindrical wall 117 of the flap 110 and the wall has become engaged in the corresponding circular opening 127 of the flap 120.

In this engaged position, the axes Y1 and Y2 of the rounded portions 111B; 121B of the webs 111; 121 of the flaps 110; 120 of the corner accessory 100 coincide with the pivot axis Y about which the flaps pivot, and said rounded portions 111B, 121B overlap at least in part (see FIG. 1).

It then suffices to cause the cylindrical walls 117 to slide along the circular edges 127A of said circular openings 117 to cause the flaps 110; 120 to pivot relative to each other about the pivot Y, thereby varying the area of overlap between the rounded portions 111B; 121B of the webs 111; 121. In this way, the angle formed between said flaps can be varied in order to match the opening of the corner accessory 100 to the angle of the corner formed by said ducts 1 at the junction onto which the flaps are to be fitted.

When the corner accessory 100 is in place at the junction between the ducts 1, the maximum height Hmax of the cylindrical walls 117 forming the projecting elements of the flap 110 serve advantageously to ensure that, in the event of an impact against the accessory, the assembly tabs 122F, 123F of the flap 120 do not pass over said cylindrical walls 117 by deforming elastically, so said flaps 110; 120 do not separate because of the projecting elements disengaging from the corresponding circular opening.

Finally, the bulges 117A on said cylindrical walls 117 forming the projecting elements of the flap 110 and the setback 127B in the circular edges 127A of the circular openings 127 of the flap 120 form marks that co-operate in order to position the two flaps 110; 120 correctly relative to each other during assembly or disassembly in order to make assembly and disassembly operations easier.

The present invention is not limited in any way to the embodiment described and shown, and the person skilled in the art knows how to make any variant within its spirit.

What is claimed is:

1. A corner accessory for placing at the junction between at least two ducts that extend in different directions, the accessory comprising two distinct flaps, one of which includes a projecting element and the other of which includes a circular opening receiving said projecting element to allow said flaps to pivot about a pivot axis, the circular edge of said opening opening out locally to a straight slot that extends radially relative to the circular edge of said opening and that opens out into a free edge of said other flap, a resilient assembly tab being defined by one edge of the slot, by a portion of the circular edge of said circular opening, and by a portion of the free edge of said other flap into which said slot opens out, wherein said projecting element is a cylindrical wall presenting firstly an outside diameter equal, ignoring clearance, to the inside diameter of said circular opening so that during pivoting of one flap relative to the other, the outside face of said cylindrical wall slides over an edge face of the circular edge of said opening, and presenting secondly a height that varies around its circumference so that during assembling the two flaps together, the assembly tab slides on a sloping edge of the cylindrical wall extending between a minimum height of the cylindrical wall and a maximum height of the cylindrical wall and elastically bends along the sloping edge until the cylindrical wall is received within the circular opening.

2. A corner accessory according to claim 1, wherein said cylindrical wall includes a bulge projecting outwards and the circular edge of said opening includes a corresponding setback in its edge face.

3. A corner accessory according to claim 1, wherein said circular opening presents an inside diameter lying in the range 2 cm to 4 cm.

4. A corner accessory according to claim 1, wherein each flap comprises a web lying between two facing flanges extending substantially at right angles to said web from to opposite sides thereof, said projecting element being provided on the inside face of a flange of said one flap.

5. A corner accessory according to claim 4, wherein said one flap carries a said projecting element on each of the facing inside faces of its flanges, and correspondingly, said other flap includes a said circular opening in its flanges.

6. A corner accessory according to claim 5, wherein the web of each flap comprises a straight portion and a rounded portion, and each of the two flanges of each flap includes a straight free edge that extends longitudinally and runs into a rounded free edge at the side connecting to a free edge of said rounded portion of said web, each of the projecting elements and each of the circular openings of each flap being placed respectively in the proximity of said rounded free edge at the side of the corresponding flange of the flap.

7. A corner accessory according to claim 6, wherein each slot opens out into said rounded free edge at the side of the corresponding flange of said other flap at the junction with the free edge of said rounded portion of the corresponding web of the flap.

8. A corner accessory according to claim 5, wherein, the resilient assembly tab is defined in each flange of said other flap, said portions of said circular edge and of said free edge forming the parallel longitudinal edges of said assembly tab.

9. A corner accessory according to claim 5, wherein each cylindrical wall forming a projecting element on the inside face of a flange of said one flap presents a maximum height beside the inside face of said web, said height decreasing progressively from a maximum to reach a minimum height beside the free edge of each said flange of said one flap.

10. A corner accessory according to claim 1, wherein said circular opening presents an inside diameter equal to about 3 cm.

* * * * *